H. C. ENGFER.
STANDING BAIL FOR LANTERNS.
APPLICATION FILED JUNE 13, 1913.

1,083,442.

Patented Jan. 6, 1914.

Witnesses
Nelson H. Copp
Russell B. Griffith

Inventor
Harry C. Engfer
By
his Attorneys

COLUMBIA PLANOGRAPH CO., WASHINGTON, D. C.

UNITED STATES PATENT OFFICE.

HARRY C. ENGFER, OF ROCHESTER, NEW YORK, ASSIGNOR TO DEFIANCE LANTERN AND STAMPING COMPANY, OF ROCHESTER, NEW YORK, A CORPORATION OF ONTARIO, CANADA.

STANDING BAIL FOR LANTERNS.

1,083,442.  Specification of Letters Patent.  Patented Jan. 6, 1914.

Application filed June 13, 1913. Serial No. 773,470.

*To all whom it may concern:*

Be it known that I, HARRY C. ENGFER, of Rochester, in the county of Monroe and State of New York, have invented certain new and useful Improvements in Standing Bails for Lanterns; and I do hereby declare the following to be a full, clear, and exact description of the same, reference being had to the accompanying drawings, forming a part of this specification, and to the reference-numerals marked thereon.

The present invention relates to lanterns and more particularly to handles or bails therefor and it has for its object to provide a simple, cheap and efficient device for maintaining the bail or handle of a tubular lantern in an upstanding position.

To these and other ends the invention consists in certain improvements and combinations of parts all as will be hereinafter more fully described, the novel features being pointed out in the claims at the end of the specification.

Figure 1:
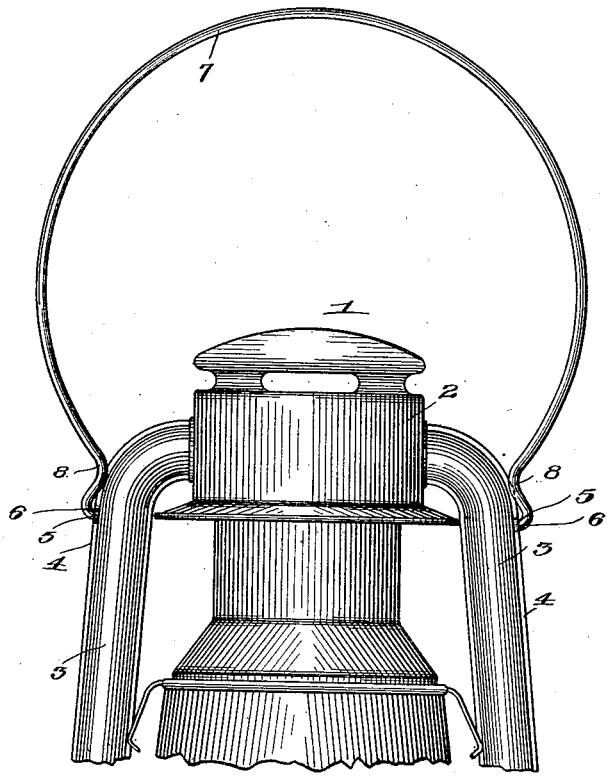
Figure 2:
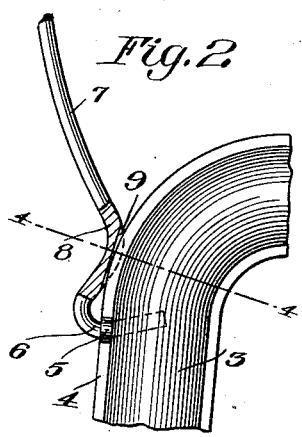
Figure 3:
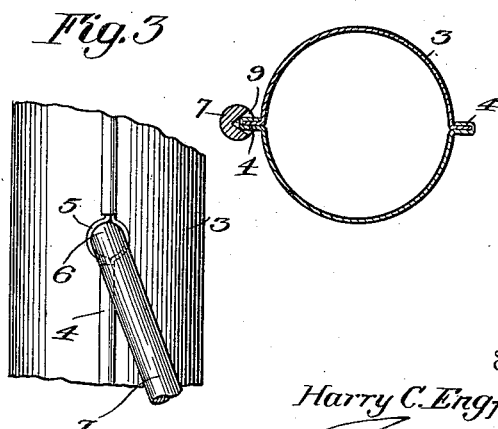
Figure 4:
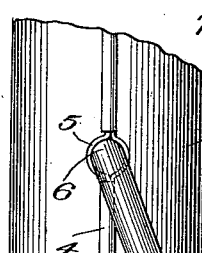

In the drawings: Figure 1 is a front elevation of the upper portion of a tubular lantern constructed in accordance with and illustrating one embodiment of my invention; Fig. 2 is a similar enlarged fragmentary view partly in section in the region of one of the journals for the bail showing more in detail the centering and holding means; Fig. 3 is an enlarged fragmentary view in side elevation of the same part but with the bail in lowered position, and Fig. 4 is a transverse horizontal section through one of the tubes taken substantially on the line 4—4 of Fig. 2.

Similar reference numerals throughout the several figures indicate the same parts.

Most if not all of the modern lanterns, as is generally known, are provided with pivoted bails or handles that swing down to a folded position against the globe or lantern body in order to reduce the height of the lantern over all, but in some instances it is more convenient to have the bail remain in an upright position as, for instance, when the lantern is temporarily placed on the ground so that the bail will be ready to the hand of the user in picking it up again or when it is desired to hang the lantern overhead by raising it from the bottom so that its bail can be engaged over a hook or nail and as before indicated, the present invention is directed toward meeting these ends.

Referring more particularly to the drawing, 1 indicates generally the lantern body comprising the dome 2 from which lead the usual side tubes 3 of a tubular lantern. These tubes 3 are two-piece structures, as shown in Fig. 4, that is, they are made of two semi-circular pieces having interlocking flanges that produce outstanding longitudinal seams or ribs 4 upon diametrically opposite sides of the tube. A portion of one of these ribs on the outside of each tube 3 near the top is formed into a bearing 5 that receives the hooked or inturned adjacent end of a wire bail or handle 7 that spans the lantern as a whole and which may thereby assume the erect position of Figs 1 and 2 or drop down to the position indicated in Fig. 3.

Each end portion of the bail 7 is, in the present instance, bent inwardly toward the tube adjacent to the bearing 5 as at 8 so that it will be in a position to engage the rib 4 as the bail swings from one position to another and in the practice of my invention I provide a longitudinal recess 9 in this portion that may be conveniently formed with a suitable punching tool which partially slits or spreads the wire, as indicated more clearly in Fig. 4. This recess is adapted to engage over and coöperate with the rib 4 as a centering and holding device due to the yielding nature of the wire bail and a slight end thrust that it is permitted in its bearings 5 and it will thus be seen that in the natural carrying or suspended position of the lantern, the rib and recess will be in engagement and will operate to normally maintain the bail in its uppermost position, but a slight lateral pressure will cause the recessed portion to ride off of the rib and allow the bail to fall to its folded position.

It will be observed that in the practice of my invention no attachments or real additions to the structure of an ordinary tubular lantern are required to produce the added function, it being only necessary to re-form slightly the shape of the bail at the point 8 and to punch or otherwise form the recess therein at one or both ends and thus a lantern of the ordinary sort not designed primarily as a standing bail lantern may be changed over to provide this function in an extremely simple manner and by utilizing exactly the same parts.

I claim as my invention:

1. In a lantern, the combination with side tubes having bearings therein and a projecting rib adjacent to one of them, of a bail spanning the lantern with its ends journaled in the bearings, one of said end portions being provided with a recess adapted to yieldingly coöperate with the rib as a centering and holding device for maintaining the bail in an upstanding position.

2. In a lantern, the combination with side tubes having seams forming longitudinal central ribs and provided with bearings centrally of the ribs and adjacent thereto, of a wire bail spanning the lantern with its ends journaled in the bearings, said end portions being provided with longitudinal central recesses adapted to yieldingly coöperate with the ribs as centering and holding devices for maintaining the bail in an upstanding position.

HARRY C. ENGFER.

Witnesses:
JOHN S. BRONK,
LUCY A. VAN COURT.